Figure 1:
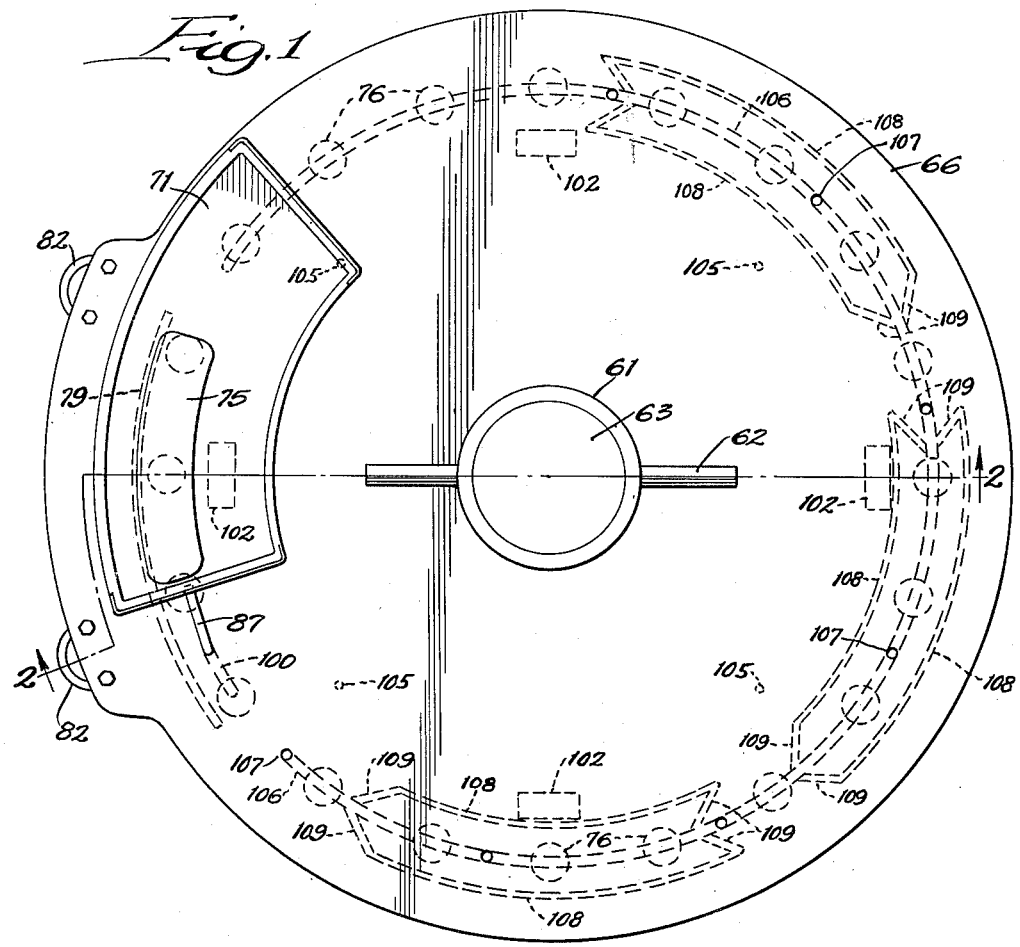

Jan. 5, 1954 L. M. ROGERS ET AL 2,665,046
LIQUID DISPENSER
Filed Feb. 2, 1952 3 Sheets-Sheet 1

INVENTORS:
Lawrence M. Rogers
and Chester A. Siver,
BY Dawson & Coons,
ATTORNEYS.

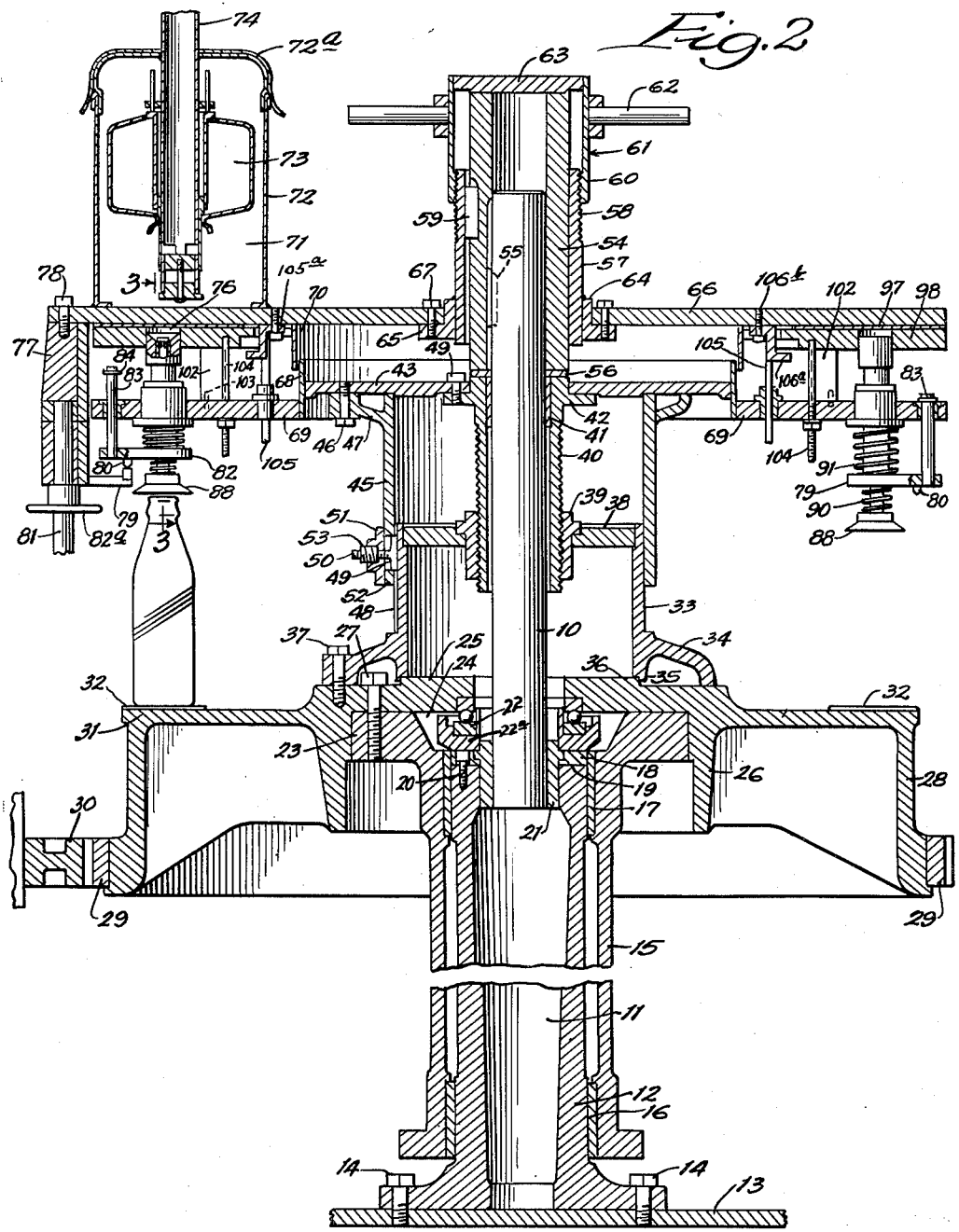

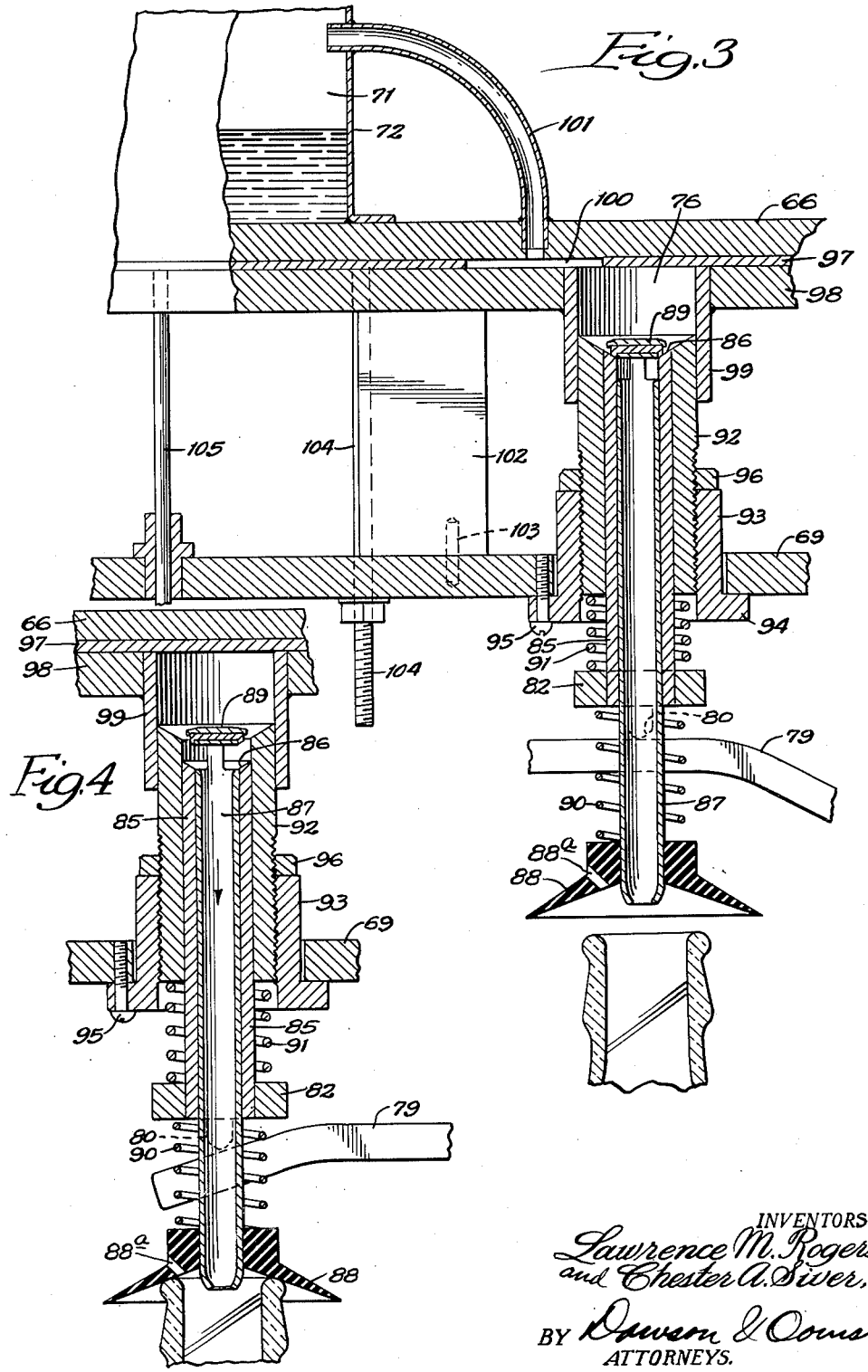

Patented Jan. 5, 1954

2,665,046

UNITED STATES PATENT OFFICE 2,665,046

LIQUID DISPENSER

Lawrence M. Rogers, Chicago, and Chester A. Siver, Hinsdale, Ill., assignors to The Liquid Carbonic Corporation, Chicago, Ill., a corporation of Delaware Application February 2, 1952, Serial No. 269,622

12 Claims. (Cl. 226—102)

This invention relates to dispensing apparatus and more particularly to apparatus for dispensing liquids such as syrups, etc. into bottles.

In plants using assembly-line methods for filling bottles with soft drinks or carbonated beverages, the filling is generally a two-stage operation. Empty bottles are first fed through a machine called a syruper where a measured volume of syrup is dispensed into the bottles, and then through a second machine where the bottles are filled with the desired filler such as carbonated water. Since bottles of various capacity may be used and since each individual flavor, etc. may require a different proportion of syrup to carbonated water, it is desirable to employ dispensing apparatus which is readily adjustable so as to add the required volume of syrup to the bottles.

In dispensers commonly employed in bottling plants using this system, a conveyer feeds empty bottles onto bottle cylinders which are spaced at intervals about the edge of a circular, revolving platform. As the platform revolves, the cylinders raise the bottles until they engage dispensing valves mounted on a platform above the bottles. The upper platform revolves in timed relation with the lower platform. As each cylinder rises, the bottle carried thereby is moved upwardly and into engagement with a valve, forcing it upwardly and causing it to release a measured volume of liquid into the bottle.

Such dispensers employ a dispensing valve and measuring chamber for each bottle cylinder. Each measuring chamber is located within a reservoir supported on the upper platform. To alter the capacity of the measuring chambers, the chambers are replaced with others having the required capacity, or more commonly, inserts of the required capacity are placed in each measuring cup. This procedure necessitates entry into the liquid reservoir and is a time consuming operation.

It is then an object of the invention to provide apparatus to dispense a measured volume of liquid into vessels such as bottles which may be easily and quickly adjusted to dispense various measured volumes. Another object of this invention is to provide dispensing apparatus in which the capacity of the measuring chambers may be accurately adjusted without entry into the reservoir. Still another object is to provide a measuring chamber and dispensing valve assembly for releasing a measured volume of liquid accurately and which is readily disassembled for cleaning in a minimum of operations. Yet another object is to provide means for changing the capacity of the measuring chambers by changing the elevation of the reservoir supporting platform in its relation to a lower valve supporting platform. A further object is to provide a vent communicating with the reservoir and each measuring chamber prior to filling to release pressure within the reservoir caused by the upward movement of the dispensing valve in preparation for filling a measuring chamber. A still further object is to provide a vent communicating between the measuring chambers and the reservoir to carry liquid remaining in the measuring chamber after the dispensing valve has been closed back into the reservoir. Other objects and advantages of this invention will appear as the specification proceeds.

Our invention is shown in an illustrated embodiment in the accompanying drawings in which—

Fig. 1 is a top, plan view of dispensing apparatus employing our invention in which the reservoir cover and float assembly have been removed; Fig. 2 is a cross-sectional view taken on the line 2—2 of Fig. 1; Fig. 3 is a detailed sectional view of the measuring chamber and dispensing valve assembly taken on line 3—3 of Fig. 2; and Fig. 4 is a detailed sectional view similar to that of Fig. 3 but showing the dispensing valve in open position.

In the illustration given, the mechanism centers about a stationary vertical shaft 10 (Fig. 2) having an enlarged lower portion 11 supported within a vertical pedestal or base 12 which is secured to a base plate 13 by bolts 14. A sleeve 15 having bearings 16 and 17 pressed therein encloses all but the lower portion of the base 12 and is rotatably mounted on the base. A ring member or flange 18 is rigidly fastened to the upper, horizontal edge 19 of the base 12 by bolts 20. The ring 18 is integral with a collar 21 which is welded to the shaft 10. A thrust bearing 22 within a bearing cup 22a rotatably supports the above structure. The bearing cup 22a, in conjunction with the flanged upper portion 23 of the sleeve 15, provides a reservoir 24 communicating with the bearing 17 that may be used to introduce a suitable lubricant to the bearings.

A circular plate 25 having an integral vertical wall 26 is mounted upon the flange 23 and secured thereto by bolts 27. The plate 25 extends outwardly from the wall 26 in a horizontal plane and in reduced cross section, terminating in an integral vertical ring member 28. The ring member 28 is provided with teeth 29 about the periphery thereof and forms a ring gear. A driving gear 30 meshes with the ring gear, thus rotating the plate 25 and sleeve 15 around the shaft 10. Any suitable power source such as a motor (not shown) may be used to drive the gear 30 through an appropriate drive assembly.

The portion of the plate 25 of reduced cross section forms a circular bottle support plate or platform 31. The support platform 31 has a plurality of bottle holders 32 spaced about the outer edge at intervals. Bottles to be filled are fed onto the bottle holders 32 and centered with respect to the syrup valve by a bottle star which is part of a suitable conveyer arrangement (not shown).

A tubular member 33 having an integral foot extension 34 is centered on the plate 25 through coaction of the lip 35 of the tubular member and ledge 36 of the plate 25. The member 33 is fastened by bolts 37 to the plate 25. A horizontal member 38 is received within the upper end of the tube 33 and is secured thereto by welding or other suitable means. A central opening is provided in the member 38 receiving a threaded collar 39 which is pressed within the opening or otherwise suitably secured to the member 38.

An externally threaded sleeve 40 threadably engages the collar 39 and is axially adjustable therein. A bearing 41 permits the sleeve 40 to rotate free of the shaft 10. The sleeve 40 is equipped with an integral flange 42 at the upper end thereof which supports a plate 43 secured thereto by bolts 44. A second tubular member 45 telescopically engaging the tubular member 33 is rigidly fastened to the plate 43 by bolts 46 extending through a flange 47 integral with the upper end of the member 45.

The tubular member 33 has a longitudinally extending slot 48 in the side wall thereof adapted to receive the head 49 of the bolt 50. The slot 48 is equipped with tapered edges that engage the tapered head 49 of the bolt to form a slot and key arrangement that locks the members and absorbs all backlash. However, the bolt is free to move longitudinally within the slot and may be positioned as required along its longitudinal extent. A rectangularly shaped casting 51 is bolted to the circular member 45 and is threaded to receive an adjusting nut 53. The nut 53 is also received on the threaded end of the bolt 50 and tightens to secure the members 33 and 45 in the desired position. The member 45 is driven in rotation by the tubular member 33 and it is therefore necessary to secure the telescoping walls of the member 45 to the member 33. This is accomplished by the bolting structure just described.

A sleeve 54 is fixed against rotational movement to the shaft 10 by the key 55. However, the key permits the sleeve 54 to move axially along the shaft 10. The lower end of the sleeve 54 rests on a bearing 56 that permits the sleeve 54 to remain stationary while the plate 43 and sleeve 40 revolve around the shaft 10. An outer sleeve 57 having threads 58 at the upper end thereof is keyed to the sleeve 54 by key 59. The key 59 prevents the sleeve 57 from rotating with respect to the shaft 10 and sleeve 54 but permits the member 57 to move axially of the sleeve 54. The threaded end of the sleeve 57 receives the threaded end 60 of an adjusting sleeve 61. Handles 62 are attached to the adjusting sleeve 61 by any suitable means and are used to rotate the adjusting sleeve around the shaft 10. The upper end of the adjusting sleeve 61 is rigidly secured to a cap 63 by suitable means such as welding. The cap 63 rests on the upper end of the sleeve 54 and supports the adjusting sleeve 61, the sleeve 57, and the structure attached to the sleeve 57.

A collar 64 is welded to the sleeve 57 at the lower end and is equipped with a flange 65. A reservoir platform or plate 66 rests on the flange 65 and is fastened thereto by bolts 67. This construction results in the reservoir platform 66 remaining stationary while the plate 43 and structure attached thereto is free to rotate with respect to the shaft 10.

The plate 43 has a ring member 68 fastened to the periphery by welding or other means rendering it secure thereto. The ring member 68 extends above and below the plane of the plate 43 and has a valve supporting plate or platform 69 rigidly secured to the lower edge thereof. A second ring member 70 having a slightly larger diameter than the ring member 68 is welded to the lower surface of the platform 66 and depends therefrom. The ring member 70 telescopically receives the upper portion of the ring member 68 and together form a telescopic seal to keep water, moisture, etc. from the shaft 10, the bearing 56, and other structure enclosed within the ring members during washing and cleaning of the apparatus.

A kidney-shaped reservoir 71 having walls 72 is supported upon the platform 66. The reservoir 71 is provided with a cover 72a, a float assembly 73 and a tube 74 through which fluid is introduced into the reservoir. The reservoir 71 has an elongated opening 75 (seen in Fig. 1) through which liquid in the reservoir is released into the measuring chambers 76. The float 73 serves to maintain the liquid within the reservoir at a constant level.

At the outer edge of the platform 66 and depending therefrom is a member 77 secured to the platform by bolts 78. The member 77 is a support for a cam 79 which engages a cam button 80. The cam 79 may be adjusted vertically by means of an adjusting member 81 provided with a rotatably mounted wheel 82a. The cam member 79 extends along the platform 66 a distance approximately equal to the length of the elongated opening 75, but starting in front of the reservoir and terminating beyond its center. The cam 79 engages a cam button 80 attached to a lever 82 thereby raising the lever during the period of engagement. The lever 82 has a guide 83 extending through an aperture in the platform 69. The guide 83 is prevented from falling through the aperture by a snap washer 84 secured to the upper end.

The valve and measuring chamber can best be seen by referring to Figs. 3 and 4. The lever 82 is secured to the lower end of a valve sleeve 85. The upper end or mouth of the sleeve 85 has a beveled edge 86. Slideably mounted within the valve sleeve 85 is a delivery or dispensing tube 87 through which liquid is dispensed from the measuring chamber 76 into a bottle position under the lower end of the tube 87. A centering-bell 88 provided with a vent 88a is rigidly secured to the lower end of the tube 87, and engages the mouth of a bottle supported on the bottle support 32 when the button 80 is not engaging the cam 79. A valve 89 is rigidly attached to the upper end of the tube 87. When in closed position, the upper, beveled end 86 of the sleeve 85 engages the valve 89 to seal the measuring chamber, as shown more clearly in Fig. 3.

A helical spring 90 is positioned around the tube 87, maintaining the lever 82 and the centering-bell 88 in spaced-apart relation. A second helical spring 91 separates the lever 82 from the chamber forming sleeve 92. The spring 91 is a little stronger than the spring 90 so that the valve sleeve 85 is not raised when the spring 90 compresses after the centering bell 88 engages a bottle. The sleeve 92 is threaded at the lower end and is received within the threads of a collar 93 having shoulders 94. The opening in the platform 69 receiving the collar 93 is slightly larger than the diameter of the collar 93 to allow shifting of the collar and in part the entire valve assembly to assure alignment of the sleeve 92 with the side walls of the measuring chamber. The collar 93 is fastened to the platform 69 by means of the bolts 95. A locknut 96 locks the sleeve 92 to the collar 93.

The reservoir platform 66 has a gasket 97 fastened to the under side by any suitable means such as cementing. In the embodiment illustrated, the gasket is made of a firm plastic material. However, other materials would be equally suitable. A plate 98 having a depending tube or sleeve 99 rides against the gasket 97 in sealing relation therewith. The gasket 97 is provided with a vent groove or opening 100 positioned in front of the reservoir in the path of travel of the tube or sleeve 99. The opening 100 is elongated, having a length slightly greater than the diameter of the tube 99 and a much smaller width. The length and position of the opening 100 will depend upon the diameter of the tube 99 and the position of the cam 79. As the cam button 80 starts up the cam ramp, the chamber 76 is in communication with the opening 100 and remains in communication with the opening until the cam button 80 reaches the top of the cam.

It is seen that the bottom of the measuring chambers provided by the sleeves 99 are formed by the members 85, 92, and 89. The tube 87 slides within the valve sleeve 85 which in turn slides within the sleeve 92, and it in turn may be slideably positioned within the depending tube 99.

All of the parts constituting the valve and measuring chamber assembly are machined to very close tolerance and the parts therefore slide within each other in sealing engagement. Therefore, the upward movement of the valve sleeve 85 and the valve 89 to a position flush with the bottom of the chamber 76 as the button 80 rides up the cam ramp would compress the air within the chamber 76 if it were not at this time communicating with the vent groove or opening 100 and a vent tube 101. It may happen that the measuring chamber 76 is filled with liquid when in this position. This will happen when a bottle is not in position under the centering bell after the chamber 76 has been filled. If a bottle is not positioned thereunder, there is nothing to arrest the downward movement of the centering bell 88, the valve will not open, and the measuring chamber will not be drained. Thus, without a vent, the filled chamber 76 would cause the parts to lock when the valve assembly moved upwardly under urging of the cam, and damage to the mechanism would result. A vent tube 101 is provided communicating with the vent groove 100 and the reservoir 71. Therefore, any fluid within the reservoir when the valve members are raised will be carried through the vent groove 100 and the vent tube 101 back into the reservoir 71. Locking of the parts is thereby prevented and the fluid returned to the reservoir where it may be used again.

The capacity of the measuring chambers 76 is determined by the axial position of the sleeve 92 and valve parts within the chamber. Since the sleeve 92 slides freely within the depending tube or outer sleeve 99, the capacity of the chamber may be readily changed by adjusting the elevation of the plate 98 and consequently, the tube 99 attached thereto, above the platform 69. The desired elevation is obtained and assured by inserting spacers 102 between the platform 69 and the plate 98. The spacers serve as gages and spacers having dimensions corresponding with various measuring chamber capacities may be provided. By simply interchanging the spacers, all of the measuring chambers are quickly and easily adjusted to the required capacity. Any number of spacers 102 may be employed and in the embodiment illustrated, four are provided spaced-apart from each other by 90°. Spacers are removed and inserted by elevating the platform 66 and the plate 98.

The constant rotation of the platforms 31 and 69 and the motion of the conveyors and other parts cause a vibration that necessitates locking the plate 98 and platform 66 in position after the chamber capacity has been set. The spacers 102, in addition to serving as the measuring scale, support the weight of the plate 98 and platform 66 and lock plates 69 and 98 in adjustment, thus insuring a continuing accurate adjustment of the measuring chambers. The spacers are held in place by a dowel pin 103 extending into an opening in the plate 69 and are locked between the plates 98 and 69 by studs 104. Four guide pins 105 spaced-apart by 90° maintain the plates 98, 69 and 66 in alignment when changing the spacers or when the plate 98 is otherwise elevated. The pins are screwed into the plate 66 and extend downwardly through a bore in the plate 69 having sufficient clearance to allow some shifting for purposes of alignment and through a bushing bolted to the plate 69.

Four brackets 105a are secured to the platform 66 by bolts 105b. The brackets are positioned approximately midway between the guide pins and approximately on the same center line. The brackets are provided with an arm 106a that extends beneath the plate 98 and serves as a stop to limit the upward movement of the platform 66, when studs 104 are locking plate 98 and platform 69, and when elevating the platform 66 to enable washing the contact surfaces of the plate 98 and the gasket 97.

The under-surface of the gasket 97 is provided with a centrally aligned vent groove or channel 106 (seen in Fig. 1) that extends nearly around the entire gasket. Apertures 107 are provided in the reservoir platform 66 at spaced distances about the platform in alignment with the channel 106. Apertures are provided in the gasket 97 communicating with the platform apertures 107 and the central channel 106. The purpose of the channel 106 and the apertures 107 is to provide a vent for all of the measuring chambers 76 to assure free drainage of liquid from each measuring chamber into a bottle engaged thereunder.

Inner and outer sealing grooves 108 parallel the vent channel 106 at a spaced distance therefrom. The grooves 108 have interrupted portions and form a plurality of longitudinally spaced-apart sealing grooves. The vent channel 106 and the sealing grooves 108 are connected together by V-shaped pumping grooves 109 at each interrupted portion. The V-shaped pumping grooves 109 collect and return to the central vent channel 106 any film of liquid adhering to the rotating plate 98. Whatever small amount of liquid accumulates in the long vent channel 106 drops into the measuring chambers 76 which are in communication with it. The amount of the liquid thus collected and returned to the measuring chambers is immeasurable so that it can be disregarded as having any effect on the amount of liquid discharged from the measuring chamber and into the bottles. The inner and outer sealing grooves 108 function to prevent seepage of liquid to the exterior. All liquid collected in these grooves is returned through the V-shaped pumping grooves 109 to the vent groove 106.

Operation

In operation the ring member 28 is driven through the driving gear 30 which engages the teeth 29 mounted on the ring member 28. A suitable power source and gearing assembly may be used to drive the gear 30. Rotation of the ring member 28 drives the bottle support member 31, the sleeve 15, and the tubular member 33. The tubular member 33 in turn drives the member 45 which in turn rotates the plate 43 and the plate 69. A conveyor arrangement (not shown) feeds bottles onto the bottle supports 32. The bottles are fed onto the holders in timed relationship with the rotation of the dispensing assembly. Since this arrangement is well-known in the art, a detailed discussion of the operation is believed unnecessary.

As the platform 69 rotates in clockwise direction, a measuring chamber 76 begins to engage the groove 100 which in turn is connected through the vent tube 101 to the reservoir 71. In this position, the cam button 80 is starting up the cam incline or ramp. During the period that the cam button 80 is traveling up the cam ramp, the sleeve 85 and valve 89 engaged by the sleeve move up to the bottom level of the measuring chamber 76, and the measuring chamber is moved from the beginning of engagement with the opening 100 to a point where engagement is about to terminate. When the cam button 80 reaches the cam flat, the valve 89 and sleeve 85 are flush with the bottom of the measuring chamber and the measuring chamber is then moved past engagement with the opening 100. A bottle is placed under the centering bell 88 by the conveyor assembly when the valve, etc. are in raised position.

Shortly before a bottle having a measured amount of liquid therein is ready to be discharged from a bottle support 32 (by contact with a rotating bottle discharge star not shown), the cam button 80 engages the cam 79 and the cam button and lever 82 are forced upwardly. This is best seen by reference to Fig. 3. Thus, the valve sleeve 85 which is rigidly secured to the lever 82 is forced upwardly. As the sleeve moves in an upward direction it engages the valve 89 and forces it, along with the tube 87 to which it is rigidly attached and the centering bell which is secured to the tube 87 at the lower end thereof, to move upwardly. The valve sleeve 85 and the valve 89 form a liquid-tight seal when in engagement.

As the platform 69 and plate 98 continue to rotate, the chamber 76 passes under the elongated opening 75 at the bottom of the reservoir 71 and the chamber is filled. During the filling operation, the valve assembly is in an upward position flush with the bottom of the chamber 76, as seen in Fig. 3.

As the platforms 69 and 98 continue to rotate, the chamber moves from under the reservoir 71 and the button 80 is disengaged from the cam 79. The action of the spring 91 forces the lever 82 and valve sleeve 85 attached thereto downwardly. The tube 87 also moves downwardly under the urging of the spring 90, and after moving downwardly a short distance, the centering bell 88 attached to the tube 87 engages the top of a bottle positioned on the bottle support below. The downward movement of the tube 87 is thereby arrested, but the valve sleeve 85 continues to move downwardly and out of sealing engagement with the valve 89 because the spring 91 is stronger than the spring 90. The fluid in the measuring chamber 76 then flows past the valve 89 and into the tube 87 and into a bottle enclosing the end of the tube. Fig. 4 shows the valve in open position.

The valve assembly remains in open position permitting fluid in the measuring chamber to drain into the bottle during the remainder of the cycle of rotation and until the bottle is removed from the platform 31 by a suitable bottle discharge star and conveyor means. Removal occurs at the instant the cam 79 raises the lever 82 and with it the centering bell 88 from contact with the bottle ready to be discharged. The vent 88a in the centering bell 88 permits air to escape from a bottle positioned thereunder, and the flow of liquid into the bottle is thereby facilitated.

In the dispensing apparatus illustrated, the reservoir supporting platform 66 is easily raised by simply rotating the adjusting sleeve 61, by means of the handles 62. This maneuver raises the sleeve 57 and the platform 66 attached thereto. This adjustment serves a dual purpose. First, it disengages the platform 66 and the gasket 97 attached thereto from the contact surface of the plate 98 to enable these parts to be thoroughly cleaned. Secondly, if the studs 104 are released, as the platform 66 is raised, the bracket arms 106a will engage the rotatable plate 98 and lift it upwardly. This will raise the tubes 99 which are attached to the plate and disengage them from the bottom of the measuring chambers to enable these parts to be properly cleaned.

In addition, this will release the spacers or blocks 102 and they may be removed from between the plate 98 and the platform 69. The removed spacers may then be replaced with others having a height that give the desired measuring chamber capacity. The platform 66 is then lowered until the plate 98 rests firmly on the spacers. Thus, the capacity of the measuring chambers may be quickly and accurately determined. Spacers may be provided to correspond with any desired measuring chamber capacity.

A fine or micrometer adjustment of the measuring chamber capacity is provided by the threaded mounting of the valve sleeve 92 within the collar 93. This adjustment permits correction of the measuring chamber capacity to compensate for manufacturing tolerances or for wearing of the equipment, etc.

The dispenser shown is easily adjustable to accommodate bottles of various heights. The distance between the bottle support platform 31 and the valve supporting platform 69 is quickly changed to receive bottles of various heights by changing the elevation of the plate or platform 69 to that required. This is accomplished by loosening the nut 53 which causes the tapered key to be retracted out of engagement with slot 48 and into a slot milled in the lower end of member 45 corresponding to the width of the tapered key. Thus the tapered key clearing the circumference of member 33 permits rotation of sleeve 45 around sleeve 33. After reaching the desired elevation, the slot 48 and tapered key are aligned by tightening the nut 53 which causes the tapered key to enter slot 48 and eventually become tightly wedged in the slot.

The reservoir 71 has a float assembly 73 therein to maintain a level of the liquid in the reservoir at a constant elevation. The operation of the float assembly is well-known and a detailed discussion of its operation is not believed necessary.

While in the foregoing specification we have shown a specific structure in considerable detail for the purpose of illustrating one embodiment of our invention, it will be understood that such details of structure may be varied widely by those skilled in the art without departing from the spirit of our invention.

We claim:

1. In apparatus for dispensing liquids into vessels, the combination comprising a plate carrying a reservoir thereon, a measuring chamber mounted beneath said plate for movement relative thereto and in sealing engagement therewith, said chamber being adapted to receive liquid from said reservoir, an aperture in said plate positioned to communicate with said chamber, and a conduit extending between said aperture and said resorvoir above the liquid level thereof to permit said chamber to be vented to said reservoir when the chamber is in open communication with said aperture.

2. In apparatus for dispensing liquids into vessels, the combination comprising a plate carrying a reservoir thereon, a plurality of sleeves mounted beneath said plate for movement relative thereto and in sealing engagement therewith, valve members forming bottoms for said sleeves and providing with said sleeves measuring chambers from which liquid may be dispensed through the valve members, means for filling said measuring chambers with liquid from said reservoir, an opening in said plate positioned in the path of movement of said tubes and adapted to communicate successively with each of said tubes, and a conduit extending between said opening and the portion of said reservoir above the level of the liquid contained therein, whereby successive communication between each of the measuring chambers and said reservoir is established and said chambers are vented into said reservoir when in communication with said opening.

3. In apparatus for dispensing liquids into vessels, the combination comprising a plate carrying a reservoir thereon, a measuring chamber mounted beneath said plate for movement relative thereto and in sealing engagement therewith and adapted to receive liquid from said reservoir at one position in its path of movement, said plate having an aperture therein positioned to communicate with said chamber at a point prior to the filling thereof with liquid from said reservoir, a conduit extending between said aperture and said reservoir above the liquid level thereof to permit said chamber to be vented to said reservoir, means for raising and lowering said plate, a platform mounted below said plate, said chamber being adjustable and having telescoping parts carried respectively by said plate and said platform, and blocks extending between said plate and said platform to control the capacity of the measuring chamber by determining the spacing between the plate and platform.

4. In apparatus for dispensing liquids into vessels, the combination comprising a plate carrying a reservoir thereon, means for raising and lowering said plate, a plurality of tubes mounted in spaced-apart relation for movement along a predetermined path below said plate with the upper ends thereof in sealing engagement with said plate, means for supporting said tubes in sealing relation with said plate, valve members for each of said tubes in slideable engagement therewith and forming bottoms for each of said tubes thereby providing with said tubes measuring chambers from which liquid may be dispensed through the valve members, the capacity of said chambers being adjustable and determined by the position of said slidable valve members in said tubes, a support for said valve members mounted below said plate, said plate having an aperture therein in the path of said tubes for successive communication therewith during movement thereof, a conduit extending between said aperture and said reservoir above the liquid level thereof to permit said chambers to be successively vented to said reservoir as said tubes communicate with said aperture, and at least one block extending between said support and said means for supporting said tubes in sealing relation with said plate to control the volume of the measuring chambers by determining the position of said valve members in said tubes.

5. An apparatus for dispensing liquid into vessels, the combination comprising a plate carrying a reservoir thereon, an annular plate mounted for rotation below said reservoir supporting plate and in sealing engagement therewith, a plurality of tubes mounted in spaced-apart relation in apertures provided around said second mentioned plate so that the upper ends thereof are in sealing engagement with said reservoir supporting plate, valve members for each of said tubes in slideable engagement therewith and forming bottoms for each of said tubes thereby providing with said tubes measuring chambers from which liquid may be dispensed through the valve members, a support member rotatably mounted below said annular plate and substantially parallel thereto for supporting said valve members, means for rotating the support member and the annular plate so that the measuring chambers move successively under said reservoir, whereby said measuring chambers are filled with the liquid carried in said reservoir, means to dispense the liquid from said measuring chambers through said valve members, said reservoir supporting plate provided with a plurality of spaced-apart apertures in the path of travel of said measuring chambers, means to change the elevation of said reservoir supporting plate and said annular plate with relation to said support member, and a plurality of spacer blocks interposed between said support member and said annular plate to establish the elevation of said annular plate above said support member and thereby control the volume of said measuring chambers.

6. The structure of claim 5 in which a sealing gasket is interposed between said reservoir supporting platform and said rotatably mounted annular plate, a vent channel extending substantially around said gasket on the underside thereof and in alignment with said measuring chambers, said gasket also provided with apertures communicating with said vent channel and the apertures in said reservoir supporting platform, and grooves on the under surface of said sealing gasket to wipe liquid from the surface of said annular plate and deliver it to the measuring chambers.

7. In liquid dispensing apparatus, the combination comprising a plate carrying a reservoir thereon, a measuring chamber mounted beneath said plate for movement relative thereto and in sealing engagement therewith, means for dispensing liquid from said reservoir and into said measuring chamber at one point in its path of movement relative to said plate, said plate providing an aperture therethrough in the path of movement of said measuring chamber for communication therewith at a point prior to the filling of said chamber with liquid from said reservoir, and a conduit extending between said aperture and said reservoir above the liquid level thereof so that said chamber is vented to said reservoir when the chamber is in communication with said aperture.

8. In liquid dispensing apparatus, the combination comprising a plate carrying a reservoir thereon, a plurality of spaced-apart sleeves mounted beneath said plate for movement relative thereto and in sealing engagement therewith in a predetermined path of travel, each of said sleeves being equipped with slidable valve members forming bottom closures for said sleeves and providing therewith measuring chambers, means for dispensing liquid from said reservoir and into each of said measuring chambers successively at one position in the path of travel of said sleeves, said valve members being slidable within said sleeves and adapted to be moved axially therein to reduce the volume of the sleeves prior to the filling thereof with liquid from said reservoir, said plate providing an opening therethrough positioned in the path of travel of said sleeves for successive communication therewith prior to the sleeves and chambers formed therewith being filled with liquid from the reservoir, and a conduit extending between said opening and the portion of said reservoir above the level of the liquid contained therein to provide a vent for said measuring chambers.

9. In apparatus for dispensing liquids into vessels, a support member, a plate movably mounted upon said support member, means for moving said plate, a valve support mounted upon said support member in spaced relation with said plate, a measuring chamber mounted below said plate and having telescoping members, one of said telescoping members being carried by said valve support and providing a bottom closure for said chamber, means for carrying another of said telescoping members in sealing engagement with said plate and providing adjustment thereof relative to the telescoping member carried by said valve support to determine the capacity of said measuring chamber, and at least one block arranged with said means and interposed between said valve support and said plate to establish the spacing therebetween and thereby establish the relative position of said telescoping members and the capacity of said measuring chamber.

10. In dispensing apparatus, a generally vertical support member, a plate mounted upon said support member for axial movement and carrying a reservoir thereon, means for moving said plate axially relative to said support member, a valve support carried on said support member in spaced relation with said plate, an annular ring member mounted beneath said plate for rotary movement relative thereto and in sealing engagement therewith, said annular ring providing an opening therethrough, a tube mounted in said ring and depending therefrom, valve members mounted upon said valve support and slidably received within said tube and providing a bottom closure therefor, means for dispensing liquid from said reservoir and into said tube, and at least one block mounted between said valve support and said annular ring for determining the spacing therebetween, the spacing between said annular ring and said valve support being effective to establish the relative position of said tube and valve members and thereby determine the volume of liquid that can be received within said tube.

11. In dispensing apparatus, a generally vertical support member, a generally horizontal valve support member carried by said support member, a plate carried by said support member in spaced relation with said valve support and axially movable thereon, said plate being substantially parallel to said valve support and having a reservoir mounted thereon, an annular ring mounted beneath said plate for rotary movement relative thereto and in sealing engagement therewith, a plurality of spaced-apart measuring chambers carried by said ring and valve support, means for dispensing liquid from the reservoir and into said measuring chambers, said measuring chambers having telescoping members carried respectively by said ring and by said valve support, and a plurality of spaced-apart blocks interposed between said valve support and said annular ring to provide a predetermination of the spacing therebetween, whereby the relative position of said telescoping members is established by said blocks with the result that the capacity of said measuring chambers is dependent upon at least the vertical dimension of said block.

12. In apparatus for dispensing a measured volume of liquid into a vessel and having a plurality of measuring chambers equipped with valves and movable through a predetermined path to receive liquid from a reservoir at one point in the path of movement and to subsequently dispense the liquid into a vessel, valve means operatively arranged with each of said measuring chambers for closing the same when the measuring chambers receive liquid from the reservoir and opening the measuring chambers to discharge the liquid contained therein into vessels, comprising a sleeve slidably mounted within each of said measuring chambers and in sealing engagement therewith, a tube slidably mounted within said sleeve and in sealing engagement therewith, said tube being equipped at its upper end with a valve adapted to sealingly seat upon said sleeve to provide a closure for the measuring chamber, a cam lever carried at the lower end of said sleeve, means for biasing said sleeve in a downward direction, means for biasing said tube in a downward direction relative to said sleeve to seat said valve upon the upper end of said sleeve, and a cam arranged in the path of movement of said measuring chambers to engage each of said cam levers at a predetermined point in the path of movement of said measuring chambers for raising the sleeve and tube upwardly and into the associated measuring chamber, and means carried by the lower end of said tube for arresting the downward movement thereof when said cam lever is free of said cam and when a vessel is under said tube so that said valve is unseated from the upper end of said sleeve to open said tube for the flow of liquid therethrough.

LAWRENCE M. ROGERS.
CHESTER A. SIVER.

References Cited in the file of this patent

UNITED STATES PATENTS

| Number | Name | Date |
|---|---|---|
| 897,420 | Small | Sept. 1, 1908 |
| 2,424,842 | Olney | July 29, 1947 |